United States Patent
Ammler

(10) Patent No.: US 10,948,076 B2
(45) Date of Patent: Mar. 16, 2021

(54) METHOD FOR OPERATING AN ELECTRICALLY ACTUABLE FEED PUMP IN A HYDRAULIC CIRCUIT

(71) Applicant: AUDI AG, Ingolstadt (DE)

(72) Inventor: Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 326 days.

(21) Appl. No.: 15/575,761

(22) PCT Filed: May 17, 2016

(86) PCT No.: PCT/EP2016/061006
§ 371 (c)(1),
(2) Date: Nov. 20, 2017

(87) PCT Pub. No.: WO2016/184846
PCT Pub. Date: Nov. 24, 2016

(65) Prior Publication Data
US 2018/0292004 A1    Oct. 11, 2018

(30) Foreign Application Priority Data

May 21, 2015    (DE) .......................... 102015006609.9

(51) Int. Cl.
*F16H 61/12*    (2010.01)
*F16H 61/00*    (2006.01)
(Continued)

(52) U.S. Cl.
CPC ......... *F16H 61/12* (2013.01); *F16H 57/0449* (2013.01); *F16H 61/0021* (2013.01);
(Continued)

(58) Field of Classification Search
CPC .. F16H 61/12; F16H 57/0449; F16H 61/0021; F16H 61/0031; F16H 2312/14;
(Continued)

(56) References Cited

U.S. PATENT DOCUMENTS 8,589,039 B2    11/2013    Nakamura et al.
8,882,480 B2    11/2014    Oomura
(Continued)

FOREIGN PATENT DOCUMENTS

CN    102086863 A    6/2011
CN    102146917 A    8/2011
(Continued)

OTHER PUBLICATIONS

Machine Traslation JP H0510273 (published Jan. 1993).*
(Continued)

*Primary Examiner* — Anne Marie Antonucci
*Assistant Examiner* — Andrew J Cromer
(74) *Attorney, Agent, or Firm* — Maier & Maier, PLLC

(57) ABSTRACT

A method for operating an electrically actuable feed pump in a hydraulic circuit, which draws in fluid from a fluid sump with a normal supplying of fluid. The fluid circulated in the hydraulic circuit can be returned back, and air is sucked in at least partially with an undersupply of fluid. The electric motor is integrated in a control circuit, which is provided with a control unit, which actuates the electric motor based on an actual rotational speed and a setpoint rotational speed with an actuation rotational speed. The evaluation unit compares the actual rotational speed to a reference rotational speed and in particular always with an identical current consumption. The evaluation unit then determines based on the comparison whether a fluid undersupply is present.

7 Claims, 2 Drawing Sheets

(51) Int. Cl.
  *F16H 57/04* (2010.01)
  *G07C 5/00* (2006.01)

(52) U.S. Cl.
  CPC ......... *F16H 61/0031* (2013.01); *G07C 5/006* (2013.01); *B60Y 2400/3084* (2013.01); *F16H 2061/0034* (2013.01); *F16H 2061/1216* (2013.01); *F16H 2061/1264* (2013.01)

(58) Field of Classification Search
  CPC ......... G07C 5/006; F02D 29/04; F04B 17/05; F04B 49/02; F04B 49/06; F04B 2203/0605; F04B 49/103
  See application file for complete search history.

(56) References Cited

U.S. PATENT DOCUMENTS

| | | | |
|---|---|---|---|
| 8,997,958 | B2 | 4/2015 | Schuller et al. |
| 9,534,683 | B2 | 1/2017 | Takehana |
| 2004/0038774 | A1 | 2/2004 | Kuroda et al. |
| 2011/0129356 | A1 | 6/2011 | Kobayashi et al. |
| 2011/0224879 | A1 | 9/2011 | Waku et al. |
| 2012/0245819 | A1* | 9/2012 | Graf ...................... F02D 41/221 701/99 |
| 2013/0118593 | A1 | 5/2013 | Wright |
| 2013/0291831 | A1* | 11/2013 | Schinkel .................. F01M 1/14 123/395 |
| 2014/0094343 | A1 | 4/2014 | Pietron et al. |
| 2016/0208719 | A1* | 7/2016 | Kawatsu .................. F04B 17/05 |

FOREIGN PATENT DOCUMENTS

| | | | |
|---|---|---|---|
| CN | 102840321 A | 12/2012 | |
| CN | 103562598 A | 2/2014 | |
| CN | 103703284 A | 4/2014 | |
| DE | 10 2011 100 836 A1 | 11/2012 | |
| DE | 10 2013 211 915 A1 | 12/2014 | |
| JP | H0510273 A * | 1/1993 | ............... F04B 49/06 |
| JP | 2005-114103 A | 4/2005 | |
| WO | 2015/046075 A1 | 4/2015 | |

OTHER PUBLICATIONS

English translation of International Preliminary Report on Patentability, dated Nov. 30, 2017, of corresponding International application No. PCT/EP2016/061006; 6 pgs.

Office Action dated Jul. 17, 2019 in corresponding Chinese Application No. 201680029178.6; 15 pages including English-language translation.

International Search Report dated Aug. 29, 2016 of corresponding International application No. PCT/EP2016/061006; 16 pgs.

Office Action dated Mar. 13, 2020, in corresponding Chinese Application No. 201680029178.6; 10 pages.

* cited by examiner

METHOD FOR OPERATING AN ELECTRICALLY ACTUABLE FEED PUMP IN A HYDRAULIC CIRCUIT

FIELD

The invention relates to a method for operating an electrically actuable feed pump in a hydraulic circuit.

Such a hydraulic circuit can be used for example in a dual transmission of a motor vehicle, so that by means of a second partial gear, a fully automatic gear change is enabled without an interruption of the traction. The transmission of the drive torque is carried out by means of two clutches which connect the two partial gears to the drive. The clutches as well as the actuators can be controlled hydraulically via the hydraulic system to engage the gear. For this purpose, at least one feed pump is provided, which draws with a normal supply hydraulic oil from an oil sump, in which the hydraulic oil that is circulated in the hydraulic system can be fed back again so that a closed hydraulic system is formed.

BACKGROUND

A generic hydraulic system of this type, which provided the starting point of the present invention, is known from DE 10 2011 100 836 A1. The electric motor of the feed pump of the hydraulic system is integrated in a control circuit which is provided with a control unit. This unit exercises controls the electric motor by setting the rotational speed on the basis of that actual rotational speed, detected by sensors, and a setpoint rotational speed. With a similar regulation of the feed pump, both the actual current consumption of the electric motor of the feed pump and the actual rotational speed of the feed pump are detected by sensors in current practice.

According to prior art it is generally not detected whether undersupplying of fluid is present in the hydraulic circuit, which can sometime lead to a transmission damage. One possible measure for detecting a fluid undersupply is arranging of a filling level sensor in the hydraulic oil sump. However, this solution is not only costly and requires many components, but in addition, the filling level sensor may be sometime also susceptible to interference during operation.

SUMMARY

The objective of the invention is to provide a method for operating a feed pump, which can be controlled via an electric motor in a actuable hydraulic circuit so as to prevent undersupplying of fluid in the hydraulic circuit in an operationally safe and simple manner.

The invention is generally based on the fact that with the rotational speed control of the feed pump, both the actual current consumption of the electric motor of the feed pump and the actual rotational speed of the feed pump are detected by sensors. Based on this background, according to the characterizing part of the patent claim, an evaluation unit for evaluation of an undersupply of fluid is assigned to the control unit. The actual rotational speed of the feed pump is compared in the evaluation unit to a reference rotational speed (which is to say to a maximum normal supply operational speed that will be defined later), and in particular, in each case it is compared to identical and therefore correlating current consumption. Based on the comparison, the evaluation unit determines whether undersupplying of fluid is present or not.

An undersupply of fluid based on signal propagation technology can therefore be determined in a simple and operationally safe manner, and also without additional components (such as for example a filling level sensor).

When such an undersupply of fluid is detected, the evaluation unit can generate a warning message. If at least one or several such warning messages are present, a corresponding indication can be provided in the inner space of the motor vehicle, so that the user of the motor vehicle can bring the vehicle to a workshop before gearbox damage occurs. The checking procedure as to whether or not such a fluid undersupply is present or not can be freely configured for any time period. For example, the check can be performed after a predetermined distance has been traveled, for example 1,000 kilometers or 500 kilometers, or at certain fluid temperatures during the operation of the vehicle.

When the actual rotational speed is detected in order to ascertain undersupplying of fluid, it must be ensured that the fluid in the hydraulic circuit has flowed back into the fluid sump while forming a sufficiently large actual filling level. For such a sensor-free determination with a test of the filling level, the evaluation unit can be provided with a filling level model unit. This unit detects all events exerting an influence on the filling level in the fluid sump, such as for example the time period during which the vehicle was turned off (in order to initialize the filling level model unit), the fluid operating temperature, a withdrawal of the feed pump or the like. Depending on these events, a time model is determined for the profile of the filling state, which simulates the profile of the actual temporal level in the fluid sump. A filling state can thus be predicted based on the temporal model of the profile of the filling state, which would be obtained in case when there are no leakages and when the hydraulic system is operating without errors.

In order to obtain a meaningful test, the test for undersupplying of fluid is carried out only when a test condition if fulfilled, wherein a filling state that is predefined for the test must be equal to or greater than said temporal model of the profile of a filling state. When the test level is reached/exceed in the model of the filling state profile, a sufficient filling state is predicted, which allows to make a meaningful comparison between the actual rotational speed and a reference rotational speed. As long as the actual rotational speed is significantly higher than the reference rotational speed when this rotational speed is considered, it will be concluded that the feed pump not only draws in fluid, but draws in additionally also an air component. This means that the rotational speed would be in this case significantly higher than the reference rotational speed, which would result for example from the operations when the feed pump draws in only the hydraulic fluid (which is to say without an air intake).

The evaluation unit is a program module which may be a part of the control unit of the hydraulic system. A particularly simple embodiment design of a variant of the signal technology propagation can be created when the electric motor of the feed pump is provided with a limit for the current as a protection against overload. The actual current consumption of the electric motor is thus limited to a maximum current consumption by means of limit imposed on the current.

The following facts can be used for testing for undersupplying of fluid with the evaluation unit mentioned above. So for example, a maximum normal supply rotational speed occurs with a normal supplying of fluid without air intake and with a maximum consumption of electric current. On the other hand, an actual rotational speed that will be obtained if the fluid is undersupplied, when there is at least a partial air intake, and at a maximum consumption of electric current by an electric motor is greater than the rotational speed obtained with the maximum normal supplying defined above.

Based on this background, the test for undersupplying of fluid is carried out as follows. For example, it is determined in a first process step whether a sufficiently high fluid filling state level is present in the fluid sump. The determination is carried out by means of the filling state model unit as described above.

If the test condition mentioned above is satisfied, the electric motor is impacted in a second process state with the maximum current consumption. For this purpose, the setpoint rotational speed is set to a greatly increased test speed. This rotational speed is higher than a rotational speed that can be displayed even with the maximum current consumption by the control circuit. As a result, an actual rotational speed is set for the electric motor. This speed is compared in a comparator unit of the evaluation unit to the maximum normal supply operational speed correlated to the maximum current consumption. If an actual rotational speed is detected which is greater than the maximum normal supply rotational speed, the evaluation unit detects undersupplying of fluid.

For a meaningful comparison of the actual rotational speed and the maximum normal supply rotational speed it may be preferred when the comparator unit is associated with a rotational speed constant unit. By means of the rotational speed constant unit it is detected whether the electric motor is operated at a constant actual rotational speed. The comparison between the actual rotational speed and the maximum normal supply rotational speed is carried out only if such a constant rotational speed is present.

It is preferred when the maximum normal supply rotational speed is determined empirically with a normal supply of fluid and without the air intake, as well as with a correlated maximum current consumption of the electric motor and with a maximum normal supply. The values of the maximum current consumption and the correlated maximum normal supply rotational speed can be in this case stored as a pair of values in the evaluation unit. For a sufficiently precise detection of undersupplying of fluid it is preferred when several such value pairs are stored, which are respectively assigned to different operating temperatures.

The advantageous embodiments and/or further developments of the invention explained above and further recited in the dependent claims can be used individually or in any desired combination—with the exception of cases of embodiments which contain clear dependencies, or in cases of incompatible alternatives.

BRIEF DESCRIPTION OF THE FIGURES

The invention and its advantageous embodiments and further developments, as well as their advantages, will now be explained with reference to the figures, which show the following.

DETAILED DESCRIPTION OF THE FIGURES

Figure 1:
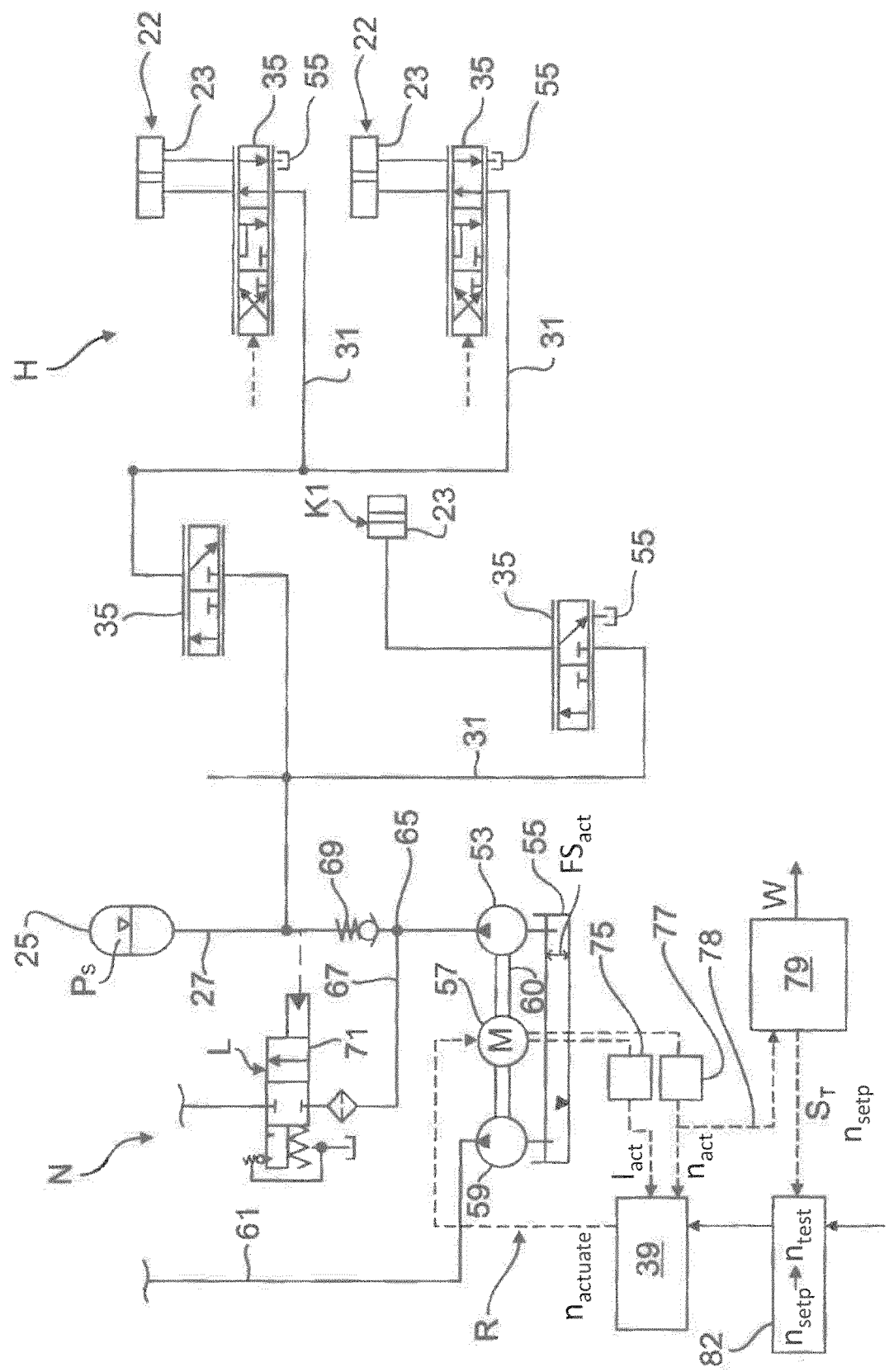
FIG. 1 shows a partial block diagram of a hydraulic system of a dual clutch drive of a motor vehicle.

FIG. 1 shows a highly simplified block diagram of a hydraulic system of a dual clutch transmission of a motor vehicle. A hydraulic cylinder 23 of the clutch K1 as well as a hydraulic cylinder 23 of actuators 22 are actuated by means of the hydraulic system. The actuators 22 are for examples dual synchronizer clutches, by means of which the gear shifts are operated in the dual clutch transmission. As shown in FIG. 1, the hydraulic system is provided with a high-pressure circuit H as well as with a low-pressure circuit N. In the high-pressure circuit H, all the hydraulic cylinders 23 of separating clutches connected in it (only clutch K1 is shown in FIG. 1), as well as the actuators 22 are impacted via a pressure accumulator 25 with a storage pressure $p_s$. For this purpose, a pressure accumulator, which is connected to a main line 27, is guided via a branch line 31, not described further, to the hydraulic cylinders 23. In the branch lines 31 are arranged respective control valves 35, which can be controlled via a central control device 39. The hydraulic system shown in FIG. 1 will be described only to the extent required to understand the invention. Therefore, the hydraulic system is provided with a feed-hydraulic pump 53, which is connected on the suction side to an oil sump 55. The feed-hydraulic pump 53 can be controlled for charging the pressure accumulator 25 via an electric motor 57 by the control unit 39. In addition, the feed-hydraulic pump 53 is arranged together with a cooling hydraulic pump 59 on a common drive shaft 60, which can be controlled by the electric engine 57. The cooling hydraulic pump 59 is also connected on the suction side to the oil sump and on the pressure side it is connected to a low pressure circuit N.

As is further apparent from FIG. 1, the components connected in the respective hydraulic circuits N, H are in each case hydraulically connected via the return lines to the oil sump 55, so that the hydraulic oil circulated in the hydraulic circuit N, H is returned again into the oil sump 55 and it is collected there while an actual filling state $FS_{act}$ is being formed.

As shown in FIG. 1, the motor actuation is carried out by means of a rotational speed circulation control circuit R, in which in addition to the control unit 39 is integrated also a current measuring device 75, which detects an actual current consumption $I_{act}$ of the electric motor 57, as well as a rotational speed sensor 77 which detects an actual rotational speed $n_{act}$ of the electric motor 57. On the input side of the control unit 39 is created a setpoint rotational speed $n_{setp}$, which together with the actual current consumption $I_{act}$ and the actual rotational speed $n_{act}$ form the basis for determining an actuate rotational speed $n_{actuate}$ by means of which the control unit actuates the electric motor 57.

The electric motor 57 is provided with supply pumps 53, 59 which are in current practice used as an overload protection with a current limit, which is set with the actual current consumption $I_{act}$ of the electric motor 57 to a limiting maximum current consumption $I_{max}$.

As is further apparent from FIG. 1, the control circuit R is connected in terms of signal propagation via a signal line 78 to an evaluation unit 79, by means of which an oil undersupply can be detected in the hydraulic circuit N, H. If such an oil undersupply is generated, the evaluation unit 79 generates a warning message W in a signal generation module 84 (FIG. 2), by means of which an oil undersupply can be indicated.

The evaluation unit 79, which will be described later and which is used to test for undersupplying of oil, uses in this case the following facts: a maximum normal supply rotational speed $n_{max,N}$ is established for a normal fluid supply without air intake and with a maximum current consumption $I_{max}$ as a maximum normal supply rotational speed $n_{max,N}$. In contrast to that, a rotational speed $n_{act}$ is established, which is greater than the maximum normal supply $n_{max,N}$, with a fluid undersupply and with at least partial air intake as well as with a maximum electric motor current consumption $I_{max}$.

Figure 2:
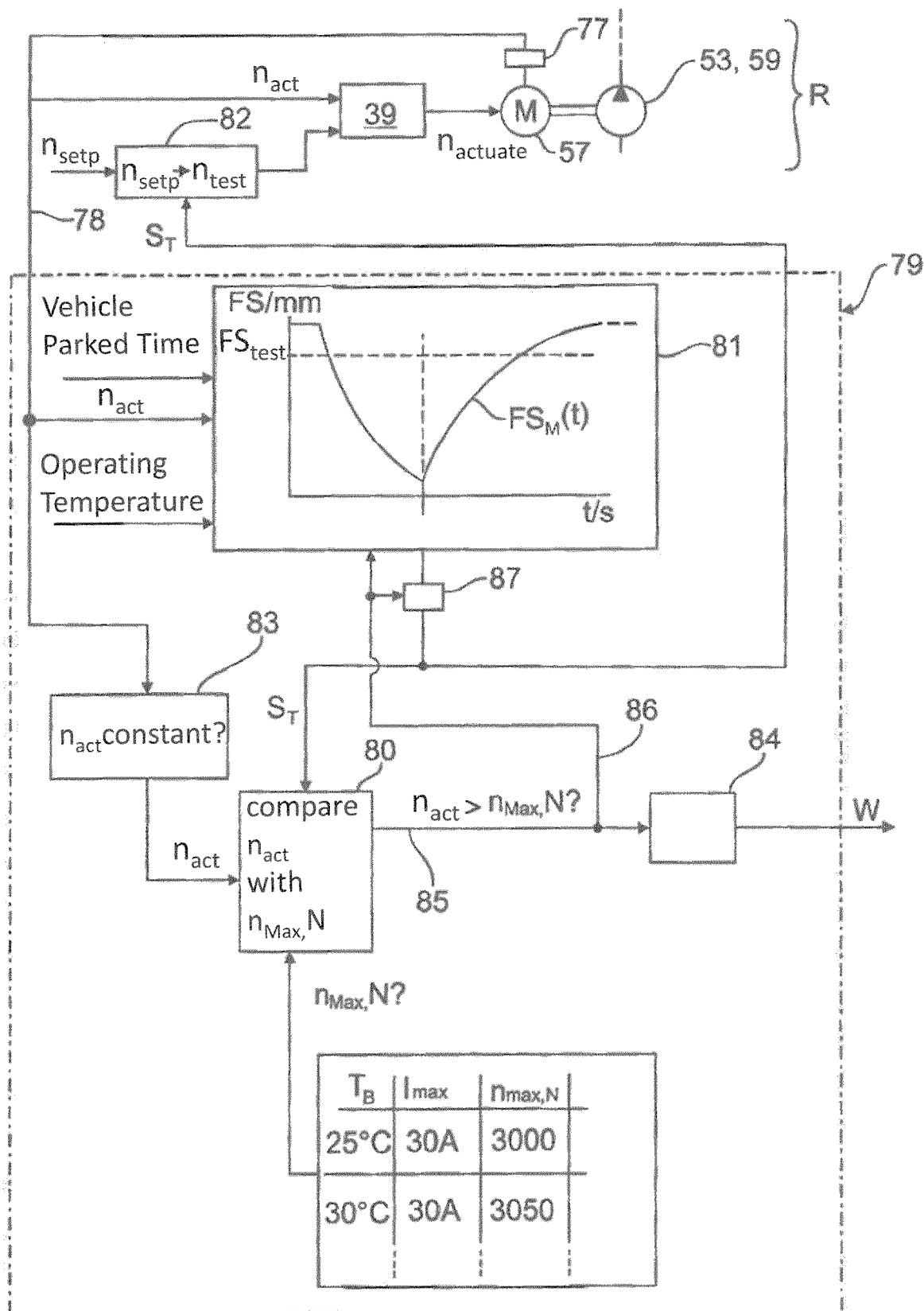
FIG. 2 shows a basic system architecture of the evaluation unit for detecting a fluid undersupply.

The basic program architecture as well as the mode of operation of the evaluation unit 79 are indicated in FIG. 2. Accordingly, the evaluation unit 79 is provided with a filling state model unit 81, which detects events exerting an influence on the current filling state $FS_{act}$ in the oil sump 55, such as for example a time period during the vehicle was turned off, or an operating temperature. The filling state unit 81 determines as a function of these events a temporal model filling state profile $FS_m(t)$, which recreates the temporal actual filling state profile $FS_{act}(t)$.

In order to obtain a meaningful test result, the actual test for oil undersupply is carried out only when a testing condition is verified, namely the condition that the temporal model filling state profile $F_{Sm}(t)$ must be greater than or equal to a predefined test filling state $FS_{test}$. The testing for an oil undersupply can be in addition also associated with another test condition, wherein the condition of a predetermined traveling distance, for example 500 km, must be also fulfilled. For this purpose, in the evaluation unit can be integrated also a suitably designed delay unit. If these testing conditions are fulfilled, a comparison unit 80 and a program module 82 are then actuated in the following process step with a trigger signal $S_T$.

The setpoint rotational speed $n_{setp}$ is then set in the program module 82 to a greatly increased test speed $n_{test}$, which is substantially greater than a rotational speed that can be represented with the maximum current consumption $I_{max}$ of the control circuit R. In this manner it is ensured that the electric motor 57 is operated with a maximum current consumption $I_{max}$ during the test for an oil undersupply.

In addition, if the trigger signal $S_T$ is present in the comparison unit 82, the actual rotational speed $n_{act}$ to be set is compared to a maximum normal supply rotational speed $n_{max,N}$. The comparison 80 unit is associated with a rotational speed constant unit 83, by means of which it is detected whether the electric motor 57 is operated at a constant actual rotational speed $n_{act}$. The comparison mentioned above is carried out only if the rotational speed constant is present in the comparison unit 80.

The maximum normal supply rotational speed $n_{max,N}$, which is to be set with a normal supplying of fluid, without air intake and with maximum current consumption $I_{max}$ of the electric motor, is determined empirically and it is stored together with the maximum current consumption $I_{max}$ as a pair of values in the evaluation unit 79. As is evident from FIG. 2, a plurality of such value pairs are stored in the evaluation unit 79, which are respectively associated with different operating temperatures $T_B$. In this manner, the comparison unit 80 can determine with interpolation of the maximum normal supply rotational speed $n_{max,N}$ that is required as a reference rotational speed in a characteristics diagram, by means of which the fluid temperature and the actual current can be indicated.

When an actual rotational speed $n_{act}$ is present, which is greater than the maximum normal supply rotational speed $n_{max,n}$, an oil undersupply is detected in the comparison unit 80. In this case, the signal generation module 84 will generate the warning signal W, by means of which the oil undersupply can thus be indicated.

As shown in FIG. 2, the comparison unit 80 is connected with a signal line 85 to the signal generation module 84. A return line 85 is branched from the signal line 85 to the filling state unit 81 and to the delay module 87.

After the test for oil undersupply has been carried out via the return line 86, the filling state model unit 81 resets again the rotational speed requirement in the program module 82 from the text rotational speed $n_{test}$ to the setpoint rotational speed $n_{setp}$. In addition, the delay module 87 is activated.

The invention claimed is:

1. A method for operating an electrically actuable feed pump comprising:
   an electric motor in a hydraulic circuit, which draws in a normal supply of fluid from a fluid sump, wherein the fluid circulated in the hydraulic circuit can be fed back into the fluid sump,
   wherein air intake occurs at least partially during a fluid undersupply condition,
   wherein the electric motor is integrated with a control circuit, which is provided with a control unit, which actuates the electric motor on the basis of an actual rotational speed and of a target rotational speed,
   wherein the control unit is associated with an evaluation unit for detection of the fluid undersupply condition, which is provided with a filling state model unit,
   wherein the evaluation unit compares the actual rotational speed of the electric motor to a reference rotational speed at an equivalent current consumption in order to detect the fluid undersupply condition, wherein the equivalent current consumption is correlated with the reference rotational speed,
   wherein the filling state model unit maintains a predictive model which generates a predicted fluid level of the fluid sump based on input data, the input data of the predictive model comprising a time variable and an occurrence of at least one event which exerts influence on an actual fluid level of the fluid sump, and
   wherein an evaluation of the feed pump for detection of the fluid undersupply condition is carried out only upon the fulfillment of a test condition in which the predictive model predicts a predicted fluid level of the fluid sump that is above a specified level.

2. The method according to claim 1, wherein the electric motor of the feed pump is provided with a current limit for overload protection, by which an actual current consumption of the electric motor is limited to a maximum current consumption,
   wherein a maximum normal supply rotational speed is determined from a rotational speed corresponding to the actual rotational speed of the electric motor which occurs when the electric motor is supplied with the maximum current consumption and the feed pump is provided with a normal fluid supply without the intake of air, and
   wherein, during a fluid undersupply condition, the target speed is set to be greater than the maximum normal supply rotational speed.

3. The method according to claim 2, wherein the evaluation unit is provided with a comparison unit which compares the actual rotational speed of the electric motor with the reference speed,
   wherein the fluid undersupply condition is determined to be present when the actual rotational speed of the electric motor is greater than the reference speed,
   wherein the actual rotation speed of the motor is that which occurs when the motor is supplied with the maximum current consumption,
   wherein the reference speed is a correlating maximum normal supply rotational speed.

4. The method according to claim 3, wherein the comparison unit is associated with a rotational speed constancy unit, by which it is detected whether the electric motor is operated at a constant actual rotational speed, wherein the comparison between the actual rotational speed of the electric motor and the maximum normal supply rotational speed is carried out only if the rotational speed constancy unit determines the electric motor is operated at the constant actual rotation speed.

5. The method according to claim 3, wherein, after checking for fluid undersupply, the target speed is reset from a testing speed, and the evaluation unit is deactivated.

6. The method according to claim 2, wherein the maximum normal supply rotational speed is determined empirically by the evaluation unit, and the maximum current consumption and a correlating maximum normal supply rotational speed are stored as a pair of values in the evaluation unit, wherein a plurality of the pair of values are stored, each pair of values being respectively associated with a different operating temperature.

7. The method according to claim 2, wherein in order to provide the electric motor with the maximum current consumption, a target rotational speed for the electric motor is set by the control circuit to a speed which exceeds an anticipated maximum rotational speed at the maximum current consumption, so that performance deviations of the feed pump from a reference feed pump may be taken into consideration.

\* \* \* \* \*